(12) United States Patent
Ensing (10) Patent No.: US 12,273,589 B2
(45) Date of Patent: Apr. 8, 2025

(54) SYSTEM AND METHOD OF PROVIDING CUSTOMIZED MEDIA CONTENT

(71) Applicant: Maris Jacob Ensing, Orange, CA (US)

(72) Inventor: Maris Jacob Ensing, Orange, CA (US)

( * ) Notice: Subject to any disclaimer, the term of this patent is extended or adjusted under 35 U.S.C. 154(b) by 0 days.

(21) Appl. No.: 18/384,024

(22) Filed: Oct. 26, 2023

(65) Prior Publication Data

US 2024/0406501 A1    Dec. 5, 2024

Related U.S. Application Data

(63) Continuation of application No. 18/221,959, filed on Jul. 14, 2023, now Pat. No. 11,838,587.

(60) Provisional application No. 63/470,087, filed on May 31, 2023.

(51) Int. Cl.
     *H04N 21/45*      (2011.01)
     *H04N 21/258*      (2011.01)
     *H04N 21/442*      (2011.01)

(52) U.S. Cl.
     CPC ... *H04N 21/4532* (2013.01); *H04N 21/25891* (2013.01); *H04N 21/44218* (2013.01)

(58) Field of Classification Search
     None
     See application file for complete search history.

(56) References Cited

U.S. PATENT DOCUMENTS

| | | | |
|---|---|---|---|
| 8,539,357 | B2 | 9/2013 | Hildreth |
| 11,769,306 | B2 * | 9/2023 | Li .......................... G06F 3/016 345/633 |
| 11,838,587 | B1 * | 12/2023 | Ensing ............... H04N 21/4532 |
| 2001/0005903 | A1 | 6/2001 | Goldschmidt Iki et al. |
| 2002/0120931 | A1 | 8/2002 | Huber et al. |
| 2004/0022278 | A1 | 2/2004 | Thomas et al. |

(Continued)

FOREIGN PATENT DOCUMENTS

WO      2019191082 A2      10/2019

OTHER PUBLICATIONS

De Araujo Tiago Maritan U., et al., "An Approach to Generate and Embed Sign Language Video Tracks Into Multimedia Contents", Information Sciences, Elsevier, Amsterdam, NL, vol. 281, Apr. 19, 2014, pp. 762-780.

*Primary Examiner* — Alexander Q Huerta (74) *Attorney, Agent, or Firm* — Shore IP Group, PLLC; Sean R. Wilsuen (57) ABSTRACT

A system for providing customized content includes a recognition device. A media transmission device is in communication with a recognition device and a media delivery device. The media transmission device is in communication with a processor and a memory storing computer instructions configured to instruct the processor to receive a primary media presentation including primary media content for a point of interest of a venue. The media transmission device generates a secondary media presentation including secondary media content for the user based on identified user preferences for the user. The media transmission device generates a custom media presentation including custom media content for the user based on the identified user preferences. The media transmission device transmits the primary media presentation, the secondary media presentation, or the custom media presentation and presents the primary media content, the secondary media content, or the custom media content to the user.

20 Claims, 7 Drawing Sheets

(56) References Cited

U.S. PATENT DOCUMENTS

| | | |
|---|---|---|
| 2009/0133051 A1* | 5/2009 | Hildreth ............ H04N 21/42204 |
| | | 725/28 |
| 2011/0105092 A1 | 5/2011 | Felt et al. |
| 2011/0314502 A1 | 12/2011 | Levy et al. |
| 2012/0311642 A1* | 12/2012 | Ginn .................... H04N 21/482 |
| | | 725/62 |
| 2013/0197981 A1 | 8/2013 | Vendetti |
| 2013/0235079 A1 | 9/2013 | Reitan |
| 2016/0072915 A1 | 3/2016 | Decanne |
| 2016/0140227 A1* | 5/2016 | Lymberopoulos .... G06F 16/635 |
| | | 707/748 |
| 2017/0064355 A1* | 3/2017 | Dong ............... H04N 21/41415 |
| 2017/0150199 A1 | 5/2017 | Prakash et al. |
| 2018/0073889 A1* | 3/2018 | Vigilante ............... G06F 3/0481 |
| 2018/0075659 A1 | 3/2018 | Browy et al. |
| 2018/0182375 A1 | 6/2018 | Fomin |
| 2018/0184152 A1 | 6/2018 | Kirkpatrick et al. |
| 2018/0302687 A1* | 10/2018 | Bhattacharjee .... H04N 21/4884 |
| 2020/0068245 A1* | 2/2020 | Sinnott ............. H04N 21/44213 |
| 2020/0133618 A1* | 4/2020 | Kim ........................ G06F 3/147 |
| 2020/0322754 A1* | 10/2020 | Soule ................. G06Q 30/0271 |
| 2021/0042351 A1* | 2/2021 | Moore .................... G06F 16/75 |
| 2021/0076106 A1* | 3/2021 | Marten ............ H04N 21/44008 |
| 2022/0253902 A1* | 8/2022 | Fowler ................ G06F 16/9554 |
| 2023/0156294 A1 | 5/2023 | Lngel et al. |

\* cited by examiner

SYSTEM AND METHOD OF PROVIDING CUSTOMIZED MEDIA CONTENT

CROSS-REFERENCE TO RELATED APPLICATION

The present non-provisional patent application is a continuation of U.S. patent application Ser. No. 18/221,959, filed Jul. 14, 2023, which claims priority to U.S. Provisional Patent Application No. 63/470,087, filed on May 31, 2023, the entire contents of which are incorporated by reference herein.

FIELD

The present disclosure relates to a system and method of providing content to a user, and more particularly, to a system and method of providing customized media content having multiple media presentations to a user.

BACKGROUND

There are many types of media delivery systems used by companies, such as, for example, billboards, service kiosks, drive-through windows, and gas station pumps, that display media to consumers in a variety of locations, such as, for example, museums, galleries, theme parks, audience centers, zoos, and roads. Often, to enhance the viewer experience, these media delivery systems will provide media content, for example to inform, educate or entertain a target audience, and/or to advertise goods or services. The media content is often played back on a display, speakers, headphones, and/or other playback devices, such as, for example, a portable or handheld device.

SUMMARY

Media delivery systems can be employed to display or deliver media to consumers in a variety of locations, such as, for example, museums, galleries, theme parks, audience centers, zoos, billboards, service kiosks, drive-through windows and gas stations. Often, to enhance the viewer experience, these media delivery systems will provide media content, for example to inform, educate or entertain a target audience, and/or to advertise goods or services. The media content is often played back on a display, speakers, headphones, and/or other playback devices, such as, for example, a portable or handheld device.

Aspects of the present disclosure relate to media delivery systems, such as media delivery systems for enhancing accessibility for individuals with hearing impairments, language barriers, and those interested in personalized media content.

Traditional media display devices, including but not limited to devices such as monitors, projectors, and loudspeakers, used in public spaces including museums, visitor centers, theme parks, cruise ships, retail venues, gas stations, banks, and sporting events often fail to cater to the diverse needs of the audience. This includes individuals with hearing impairments, non-native language speakers, and those desiring a more personalized version of the available media. Aspects of the present disclosure provide a system and method that addresses these issues and offer a more inclusive, accessible, and customizable media experience for visitors to various venues.

Aspects of the present disclosure provide a personalized media delivery system (PMDS) that utilizes various recognition technologies like RFID sensors, NFC tags, QR codes, facial recognition, or location-based technologies such as GPS or other localization methods to identify users and deliver personalized media content based on their preferences. The PMDS may operate in conjunction with a smart device (e.g., a smartphone or other personalized device) owned or provided to the visitor, which connects to personal listening or viewing devices. Scanning a sensor or tag may prompt the system to deliver a customized secondary media presentation (e.g., a media presentation that is customized, semi-customized, or in some way varied with respect to a general or primary media presentation that might be viewed by a general audience), such as via Wi-Fi, Bluetooth or other wireless channels to the user's device.

Provided in accordance with aspects of the present disclosure is a system for providing customized content including a system for providing customized content includes a recognition device configured to identify a user and the presence of the user at a venue. The venue includes at least one point of interest. A media delivery device is associated with (e.g., carried by or in the vicinity of) the user. A media transmission device is in communication with the recognition device and the media delivery device. The media transmission device is in communication with a processor and a memory. The memory stores computer instructions configured to instruct the processor to receive a primary media presentation including primary media content for a point of interest of the venue. The media transmission device identifies user preferences for the user. The media transmission device generates a secondary media presentation including secondary media content for the user based on the identified user preferences for the user. The media transmission device generates a custom media presentation including custom media content for the user based on the identified user preferences. The custom media content includes at least some of the primary media content and at least some of the secondary media content. The media transmission device transmits the primary media presentation, the secondary media presentation, or the custom media presentation. The media transmission device presents the primary media content, the secondary media content, or the custom media content to the user. The presented media content includes at least one of audio, visual or tactile content.

In an aspect of the present disclosure, the media delivery device is a handheld device.

In an aspect of the present disclosure, the media delivery device includes or is in communication with a hearing aid, headphones, or a wireless earpiece. The hearing aid, the headphones, or the wireless earpiece is configured to emit the primary media presentation, the secondary media presentation, or the custom media presentation. The media delivery device may also include or may be in communication with a speaker, or other sound projecting device that can be heard by multiple users In an aspect of the present disclosure, the media transmission device is configured to generate custom media content for the user based identified user preferences. The user preferences are selected from preferred language, preferred learning style, visual presentation for the hearing impaired, auditory presentation for the visually impaired, tactile presentation for the visually impaired, preferred presentation style based on education level, or preferred presentation style based on personal interests.

In an aspect of the present disclosure, the venue at which the presence of the user is identified is a museum, a visitor's center, a park, a doctor's office, an exhibit, a theater, a public space, a theme park, a retail establishment, a restaurant, a cruise ship, a hotel, a resort, a sports arena, or a sports stadium.

In an aspect of the present disclosure, the media delivery device includes a monitor, a screen, a touch screen, a projector, a loudspeaker, a speaker, a text-based display, or a tactile display.

In an aspect of the present disclosure, a sensor or scanner is configured to geolocate a location of the user in the venue. The transmitted primary media presentation, secondary media presentation, or custom media presentation includes media content relevant to the location of the user in the venue.

In an aspect of the present disclosure, the recognition device is configured to identify the user by at least one of facial recognition, scanning a bar code, scanning a QR code, a global positioning system (GPS) signal, locational triangulation, or receiving a near-field communication signal.

In an aspect of the present disclosure, the custom media presentation includes content from a live broadcast or live coverage of an event.

In an aspect of the present disclosure, at least two of the recognition device, the media delivery device, or the media transmission device are in wireless communication with each other through a wireless connection.

In an aspect of the present disclosure, the media transmission device is configured to allow the user to select from the primary media presentation, the secondary media presentation, or the custom media presentation.

In an aspect of the present disclosure, a neural network is in communication with the media transmission device. The neural network includes at least one of an artificial intelligence (AI) drive search module, or a natural language processing module. The custom media content is generated by the AI driven search module or the natural language processing module of the neural network.

Provided in accordance with aspects of the present disclosure is a computer-implemented method of providing customized content including identifying a user and the presence of the user at the venue. The venue includes at least one point of interest. The method includes receiving a primary media presentation including primary media content for a point of interest of the venue. The method includes identifying user preferences for the user. The method includes generating a secondary media presentation including secondary media content for the user based on the identified user preferences for the user. The method includes generating a custom media presentation including custom media content for the user based on the identified user preferences. The custom media content includes at least some of the primary media content and at least some of the secondary media content. The method includes transmitting the primary media presentation, the secondary media presentation, or the custom media presentation from the media transmission device to the media delivery device. The method includes presenting the primary media content, the secondary media content, or the custom media content to the user. The presented media content includes at least one of audio, visual or tactile content.

In an aspect of the present disclosure, the method includes transmitting the primary media presentation, the secondary media presentation, or the custom media presentation from a media transmission device to a handheld device. The method includes presenting at least some of the primary media content, the secondary media content, or the custom media content to the user through a hearing aid in communication with the media transmission device or the handheld device.

In an aspect of the present disclosure, the method includes geolocating a location of the user in the venue. The method includes transmitting media content relevant to the location of the user in the venue. The method includes presenting the media content relevant to the location of the user in the venue.

BRIEF DESCRIPTION OF THE DRAWINGS

Various aspects and features of the present disclosure are described hereinbelow with reference to the drawings wherein.

DETAILED DESCRIPTION

Descriptions of technical features or aspects of an exemplary configuration of the disclosure should typically be considered as available and applicable to other similar features or aspects in another exemplary configuration of the disclosure. Accordingly, technical features described herein according to one exemplary configuration of the disclosure may be applicable to other exemplary configurations of the disclosure, and thus duplicative descriptions may be omitted herein.

Exemplary configurations of the disclosure will be described more fully below (e.g., with reference to the accompanying drawings). Like reference numerals may refer to like elements throughout the specification and drawings.

Figure 1:
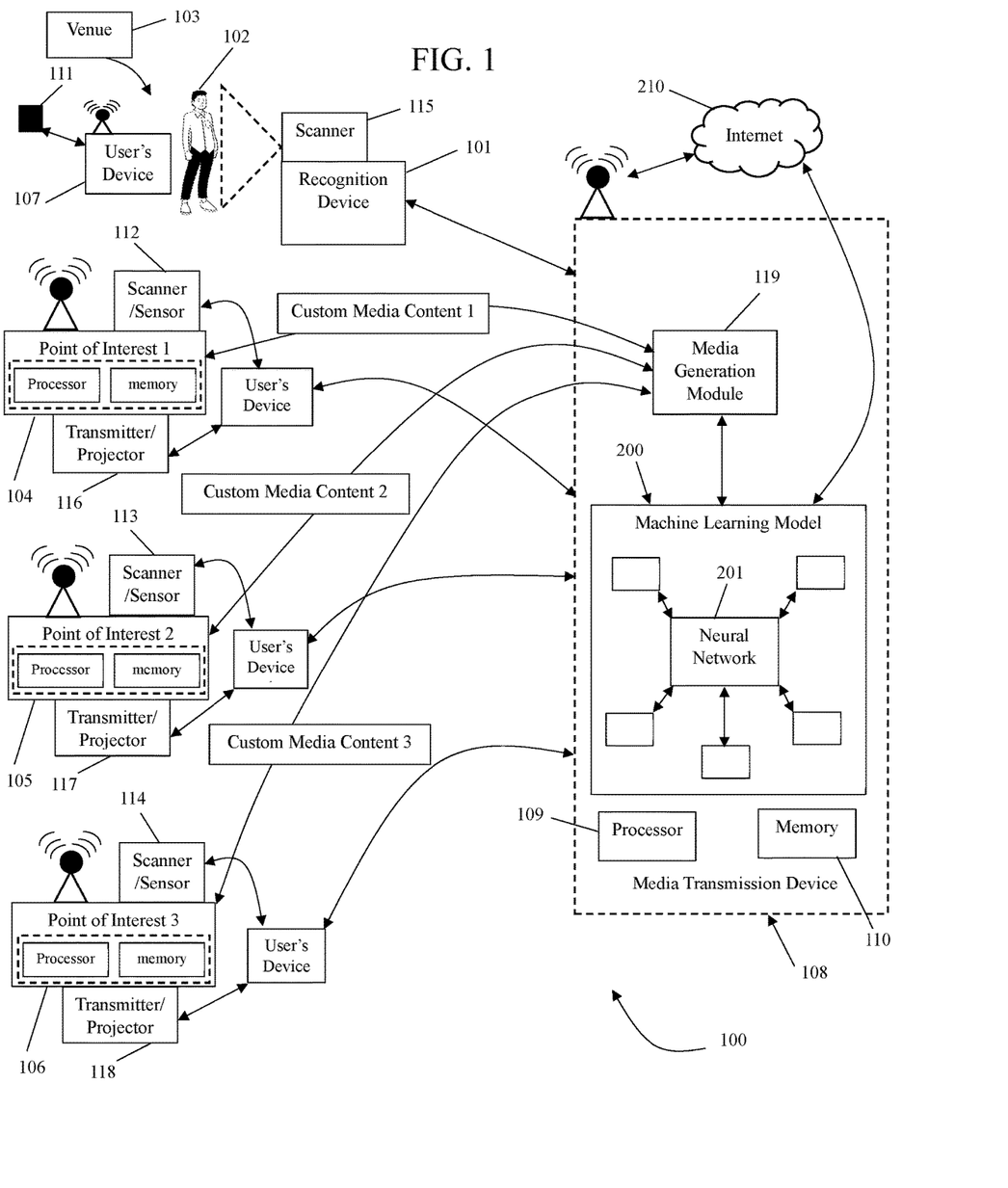
FIG. 1 is a schematic diagram of a system for providing customized media content by according to aspects of the present disclosure.
Figure 7:
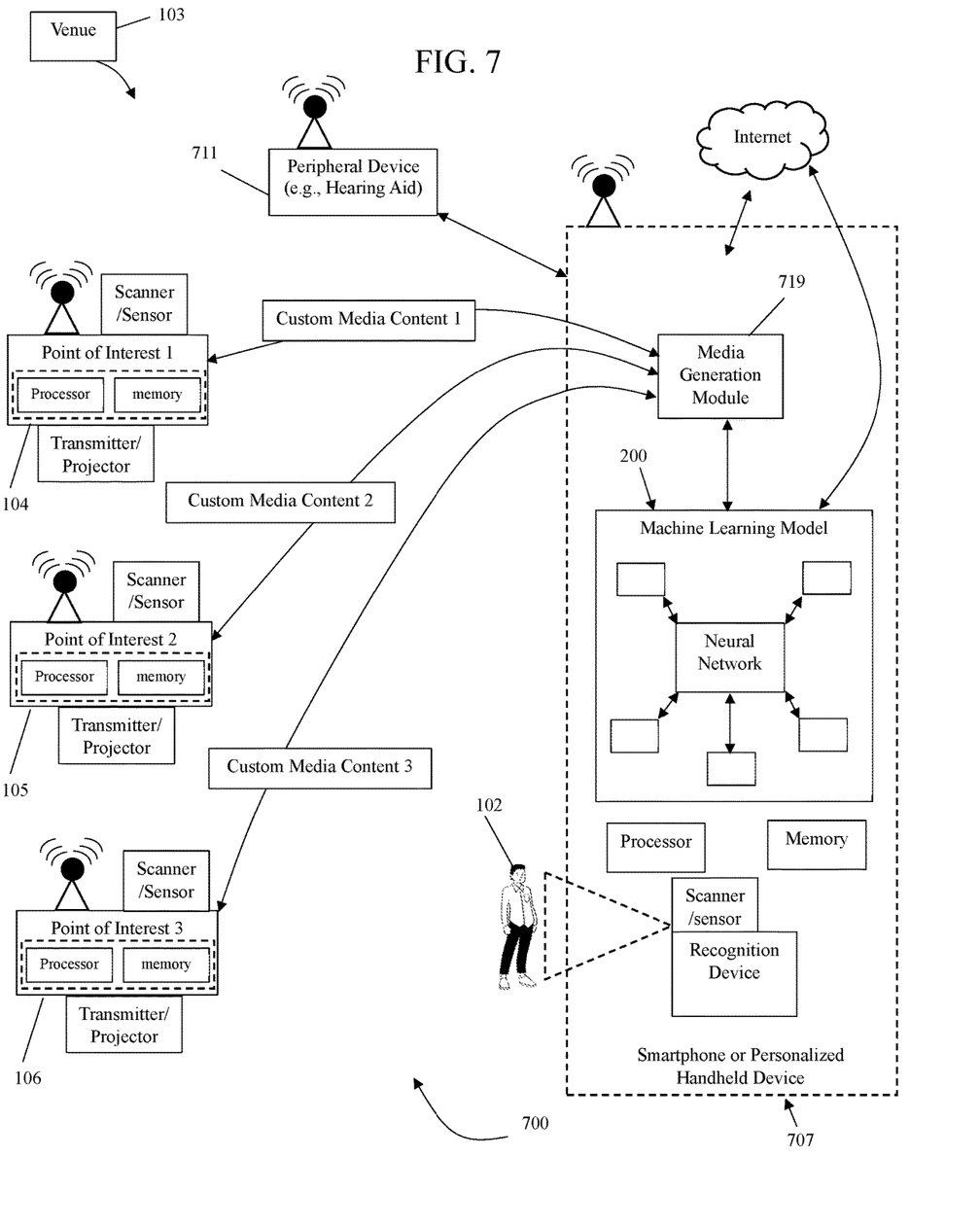
FIG. 7 is a schematic diagram of a system for providing customized media content by a media transmission device operating on a smartphone or personalized handheld device according to aspects of the present disclosure.
Figure 8:
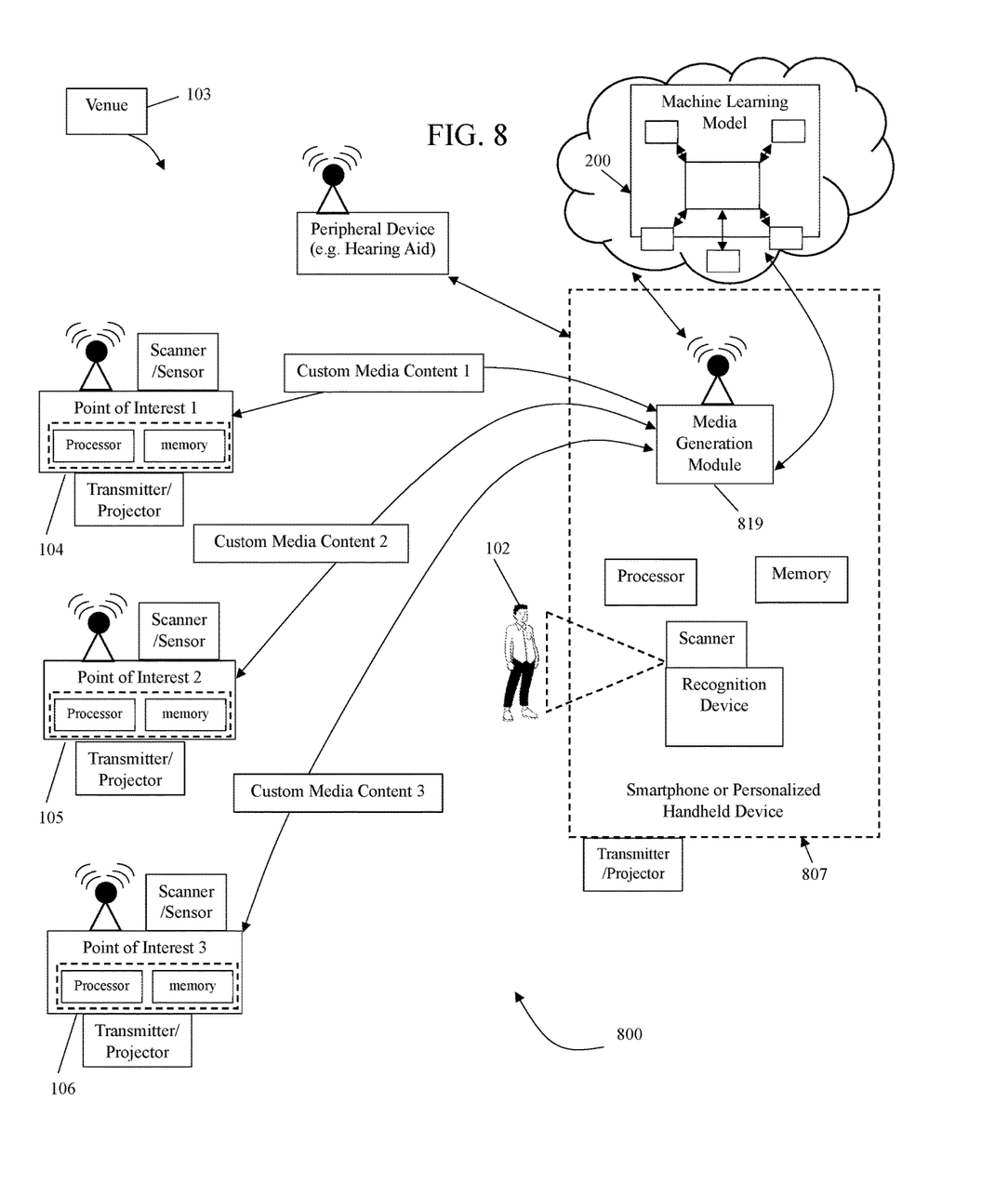
FIG. 8 is a schematic diagram of a system for providing customized media content by media transmission device operating with a cloud-based machine learning model according to aspects of the present disclosure.

The personalized media delivery system (PMDS) described herein (e.g., system 100, system 700, or system 800) can be employed in various venues, including but not limited to museums, visitor centers, theme parks, resorts, public transport, cruise ships, smart cities, retail venues, sports bars, banks, and customer support counters. It can also enhance the visitor experience at historical markers in historic locations or augment information panels at various venues.

By incorporating various recognition technologies and delivering personalized media presentations, the PMDS not only enhances accessibility for users with hearing impairments or language barriers but also offers a highly customized and immersive media experience to all users. The system described herein has the ability to convert live feeds into the media presentations described herein.

As an example, the PMDS may provide a primary media presentation designed for a general audience, a secondary media presentation (e.g., a presentation that is partially customized for a user or a group of user's), or a customized media presentation that is specific to an individual user. Custom media content may be generated based on user preferences.

The PMDS may generate or include more than one secondary presentation, such as any number of secondary presentations to support different languages, different personalization options, or to provide various options to a particular user (e.g., a first secondary media presentation that has a scientific content and communication style, a second secondary media presentation that has a historical content and communication style, or a third secondary media presentation that has an artistic content and communication style).

The secondary presentations and/or the customized media presentation may be synchronized or near synchronized with the primary media presentation, and made available to a user at the same time. In the case of interactive exhibits, the media can either be pre-rendered such that as a different path through the interactive is selected by the user, or the corresponding media can be transmitted on a secondary media channel. A user may have the option to toggle between a primary media presentation channel, a secondary media presentation channel, or a custom media presentation channel. For example, a user may toggle to a primary media channel for a first point of interest, a secondary media channel for a second point of interest, and a custom media channel for a third point of interest.

As an example, a visitor or user may set up parameters (e.g., user preferences) before arriving at a venue (e.g., from home), or they may do so as they enter the venue equipped with the PMDS. The user may carry a smart device (e.g., a smartphone, virtual reality (VR) headset or personalized device), audio device (e.g., speaker, headphones, or a hearing aid), a smart tablet, or a device provided by the venue. This device can be connected to the system via Wi-Fi, Bluetooth or other wireless connection methods. For visitors with hearing aids, headphones, wireless headphones, VR headsets, or other personal audio, video devices or other portable devices, these can be connected to the smart device to deliver media content. Any peripheral device configured to deliver media to the user and connected with a device associated with the user (e.g., the smartphone or other personalized device) can be employed to deliver the media content described herein.

The user preferences may be entered in a free-form text entry manner or may be selected from a number of pre-populated options. Special requests may also be submitted and processed by the system. As an example, a user may transmit user preferences via email, test message, or other written entry.

The media display device, which is associated with the user, can be a handheld device and it can communicate with a hearing aid or any other assistive device such as a braille reader or braille pad, or a tactile delivery device configured to deliver coded messages, such as morse code.

In the case of live events such as conferences, sporting events, live performances, or political speeches, the system can convert the live feeds into supporting data presentations and deliver them to the user's device. This allows visitors to enjoy live events with the same level of customization and personalization. This may include translation, interpretation, or media augmentation to assist or enhance the user's experience of an event by delivering media content that is aligned with the user's preferences.

As a user moves around a venue, the system can continue to track their location and adjusts the content delivered to the user's device accordingly. This ensures that the visitor receives relevant and personalized content throughout their visit. Locational tracking can also be achieved by the user interacting with the PMDS via buttons, touchscreens, or other means to select different paths or options.

The media presentations described herein may include any combination of audio, video, lighting, special effects, tactile, olfactory, or other similar media features. The various features of each media presentation may be transmitted in a single channel (e.g., a single data channel) or in multiple channels (e.g., multiple data channels). As an example, a user only in need of an audio presentation, but not a visual presentation, much receive the audio presentation on an audio specific data transmission channel. A particular media presentation might include multiple video channels provided to multiple different screens or projectors, and/or multiple different audio channels, and/or multiple different lighting or special effects channels, all of which can be incorporated into an immersive media presentation for a user.

The system described herein may employ a show controller that controls a primary media stream. When the primary media stream is started by the show controller (or when the show controller is told that the primary media source has been started by another source) then the show controller may transmit and/or display one or more of a number of secondary, tertiary, etc. media streams (e.g., streams with custom content). A second server may be synchronized with a primary media server, and thus two servers may operate simultaneously and at substantially the same speed so that at least two substantially synchronized media streams are running and accessible to users. As an example, one or more primary stream(s), and any number of secondary (e.g., custom) media streams can be accessed by a user. For example, multiple media streams may include a hearing assist in English stream (e.g., using American Sign language), a stream for Portuguese (e.g., using Brazilian sign language), a stream for Hindu language only, and a Swahili subtitles only stream. The second server might also operate independently, without the operation of the primary server.

An interactive exhibit may have many different paths through it. For example, a visitor might be given one of 3 selections, such as a question of "did Tesla invent the steam engine," with answers "yes," "no," and "I do not know." When the initial media stream is started (including the content asking the question "did Tesla invent the steam engine," with video and audio accompanying), the server of the system described herein may also start a secondary media stream substantially in sync with that primary media stream either by the interactive exhibit, or by the show controller. That is, when the visitor answers the question with one of the possible answer noted above, the interactive exhibit can launch one of a number of secondary media streams based on the answer to the inquiry in the initial media stream.

The system described herein may employ a game generation engine utilizing the machine learning model described herein that generates multiple media streams in real-time when a user is present at a venue and syncs the media streams with an interactive game played by a user.

The media content, custom media content, and media streams including media content described herein may be generated by a media generation module employed by a media transmission device. The media generation module may employ the machine learning models described herein to generate the media content.

Figure 2:
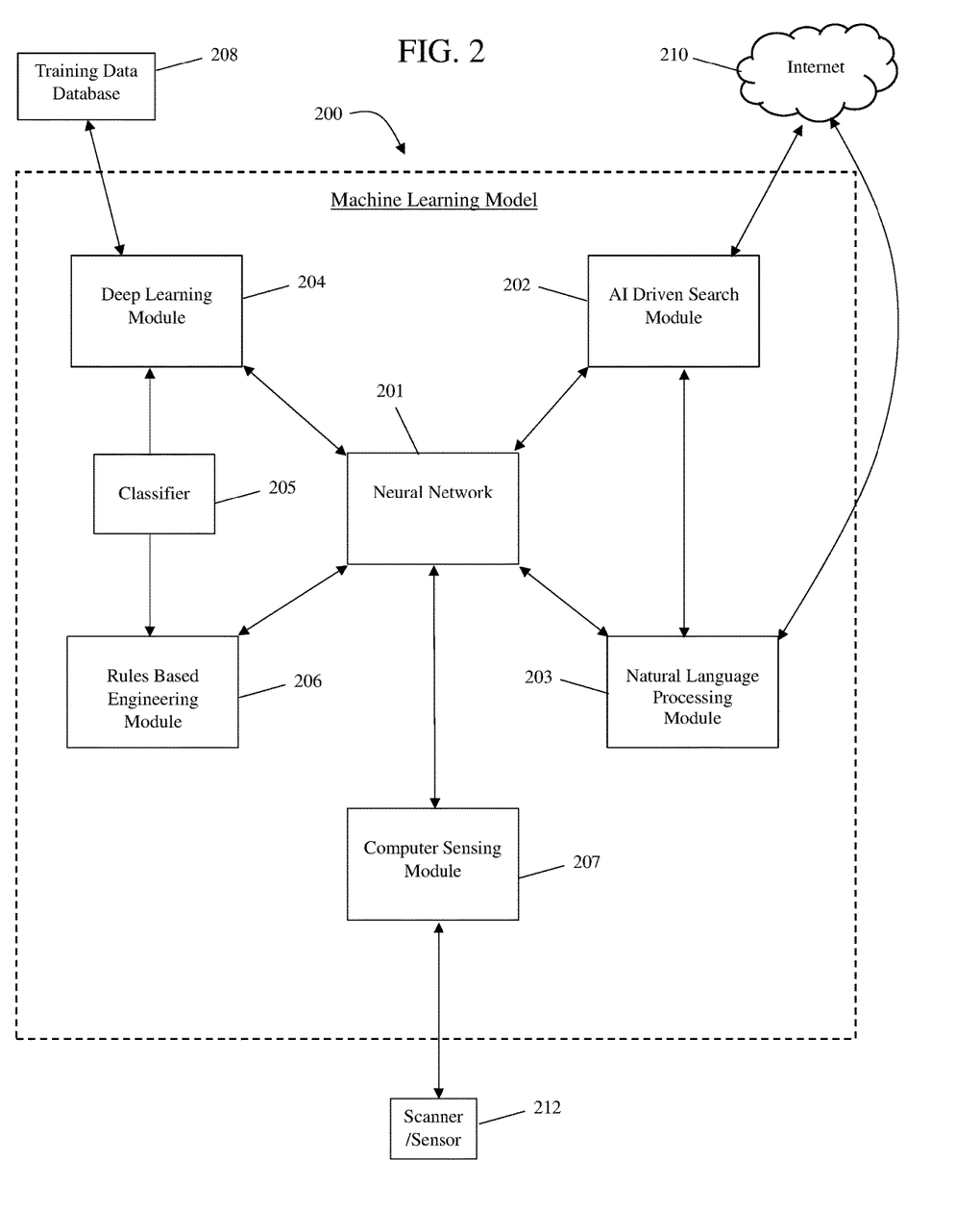
FIG. 2 is a schematic diagram of an artificial intelligence system employable by the system for providing customized media content of FIG. 1.

Referring particularly to FIGS. 1 and 2, a system 100 for providing customized content includes a recognition device 101 configured to identify a user 102 and the presence of the user 102 at a venue 103. The recognition device 101 may be a standalone device, or recognition of the user 102 may be achieved using a smartphone or other personalized device (e.g., a personalized handheld device, such as user's device 107). The recognition device 101 may include a scanner and/or senor 115. The user 102 may be identified by facial recognition, fingerprint scanning, license plate scanning/recognition, or the user entering some identifying information.

In one aspect of the present disclosure, the recognition device 101 identifies the user 102 through at least one user by at least one of facial recognition, scanning a bar code, scanning a QR code, a global positioning system (GPS) signal, locational triangulation, or receiving a near-field communication signal. Additionally, the system 100 can employ a sensor or scanner (e.g., scanner/sensors 112, 113, or 114) that geolocates the user 102 within the venue 103 and delivers content relevant to their location. In another aspect, a media transmission device 108 is preset to deliver a particular type of pre-generated or real-time generated media to a media delivery device (e.g., user's device 107, or media delivery devices 116, 117, or 118) based on pre-set information (e.g., the primary media content described herein).

In an aspect of the present disclosure, the venue 103 at which the presence of the user 102 is identified is a museum, an exhibit, a theater, a public space, a theme park, a retail establishment, a restaurant, a cruise ship, a hotel, a resort, a sports arena, or a sports stadium.

In an aspect of the present disclosure, the media delivery device (e.g., user's device 107, or media delivery devices 116, 117, or 118) includes a monitor, a screen, a touch screen, a projector, a loudspeaker, a speaker, a text-based display, and/or a tactile display.

The venue 103 includes at least one point of interest (see, e.g., points of interest 104, 105, or 106). The points of interest may be, for example, an exhibit, display, historical landmark, presentation, entertainment attraction, or the like. The media delivery device (e.g., a smartphone or other personalized device, such as a personalized handheld device) is associated with the user 102. The media delivery device may be carried by the user 102, such as about the user's body, or the media delivery device may be a device in the vicinity of the user, such that the user 102 can observe media content communicated by the media delivery device. The media delivery device may be a mounted device (e.g., a fixed screen or audio device), or a portable screen and/or audio device. As an example, the media delivery device may be a hand-held device, a drone carried device, or a device mounted to a cart, wheelchair, walker, stroller, or other mobile device.

The media transmission device 108 is in communication with the recognition device 101 and the media delivery device. The media transmission device 108 includes the media generation module 119 in communication with the machine learning model 200 for generating the media, media streams, or custom media content, as described herein. The media transmission device 108 may be in communication with or may include a processor 109 and a memory 110. The memory 110 stores computer instructions configured to instruct the processor 109 to receive a primary media presentation including primary media content for a point of interest of the venue 103. The media transmission device 108 identifies user preferences for the user 102. The media transmission device 108 may include or be in communication with a computer, such as computer 600 described in more detail below.

The media transmission device 108 generates a secondary media presentation including secondary media content for the user based on the identified user preferences for the user 102. The media transmission device 108 generates a custom media presentation including custom media content for the user based on the identified user preferences. The custom media content includes at least some of the primary media content and at least some of the secondary media content. The media transmission device 108 transmits the primary media presentation, the secondary media presentation, or the custom media presentation. The media transmission device 108 presents the primary media content, the secondary media content, or the custom media content to the user 102. The presented media content includes at least one of audio, visual or tactile content.

The media delivery device (e.g., user's device 107, or media delivery devices 116, 117, or 118) may include or may be in communication with a hearing aid, headphones, a wireless earpiece, or other peripheral devices (see, e.g., peripheral device 111 in FIG. 1, peripheral device 711 in FIG. 7, or peripheral device 811 in FIG. 8). The hearing aid, the headphones, the wireless earpiece, or the other peripheral device is configured to emit the primary media presentation, the secondary media presentation, or the custom media presentation. The media presentation may also be communicated to a speaker or projector (see, e.g., media delivery devices 116, 117, or 118) in the vicinity of the user 102.

The media transmission device 108 is configured to generate or receive custom media content for the user 102 based identified user preferences. The user preferences may be selected from preferred language, preferred learning style, visual presentation for the hearing impaired, auditory presentation for the visually impaired, tactile presentation for the visually impaired, preferred presentation style based on education level, or preferred presentation style based on personal interests.

As an example, the secondary or customized media content may include subtitles (e.g., subtitles in various languages), a sign language presentation (e.g., American Sign Language (ASL)), or any other content for communicating with a user have special needs.

In an aspect of the present disclosure, a sensor or scanner (see, e.g., scanners/sensors 112, 113, or 114) is configured to geolocate a location of the user 102 in the venue 103. The transmitted primary media presentation, secondary media presentation, or custom media presentation includes media content relevant to the location of the user 102 in the venue 103. The location of the user 102 in the venue 103 can be identified by at least one of facial recognition, scanning a bar code, scanning a QR code, a global positioning system (GPS) signal, locational triangulation, or receiving a near-field communication signal.

Figure 6:
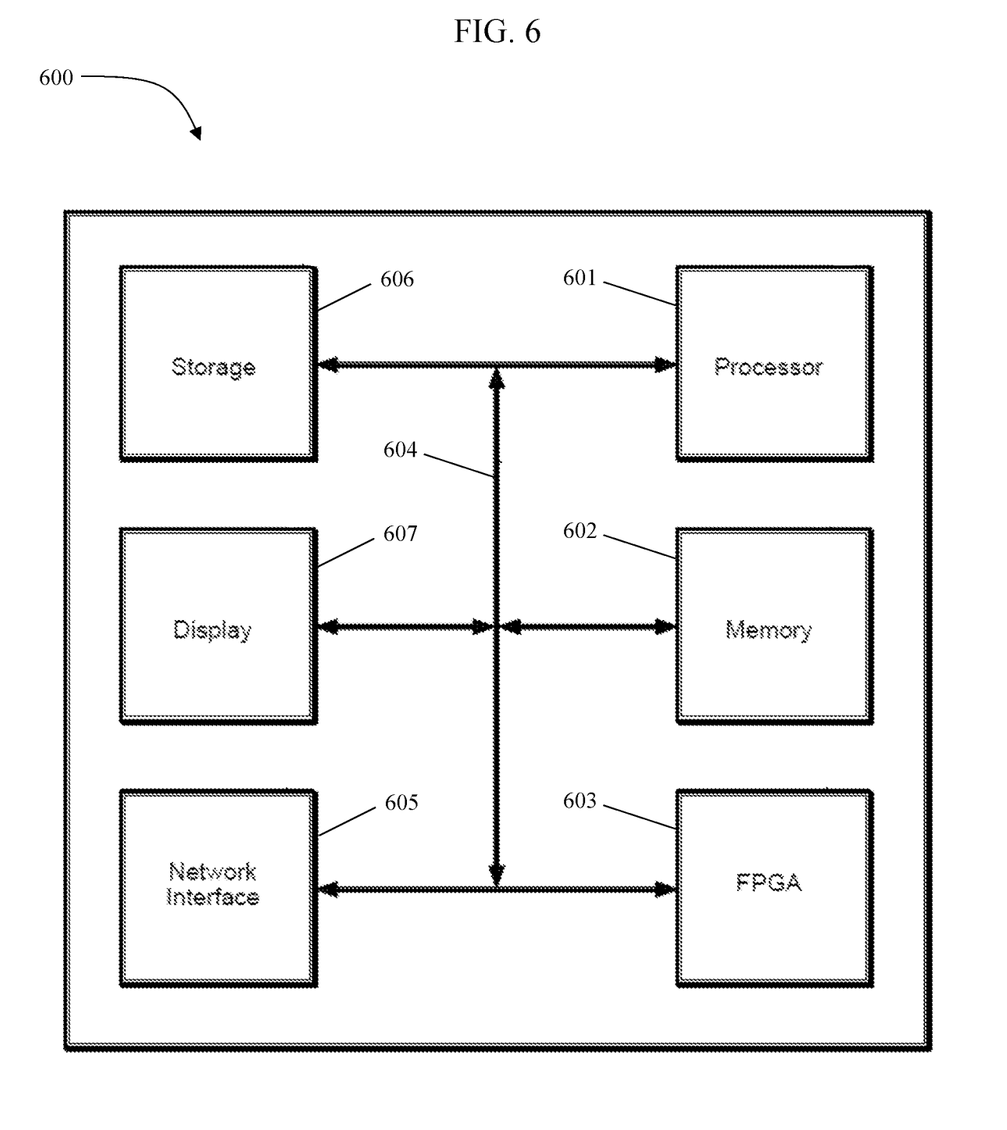
FIG. 6 is a block diagram of an exemplary computer for implementing the method of providing customized media content according to aspects of the present disclosure.

In an aspect of the present disclosure, the recognition device 101 is configured to identify the user 102 by at least one of facial recognition, scanning a bar code, scanning a QR code, or receiving a near-field communication signal. As an example, each point of interest may include, or be in communication with a scanner and/or sensor configured to identify the location of the user 102 near that point of interest. The user 102 may present the user's device 107 with a scannable code or a signal that indicates to the point of interest that the user 102 is nearby. The point of interest may then request media content from the media transmission device 108 for that user 102. Each point of interest can include a processor and a memory (e.g., as part of a general purpose or custom computer system, such as computer 600 described in more detail below) employed by the point of interest.

In an aspect of the present disclosure, the custom media presentation includes content from a live broadcast or live coverage of an event. For example, the media transmission device 108 may deliver live feeds from events such as without limitation conferences, sporting events, and political speeches (e.g., as supporting data presentations included in the primary, secondary, or custom media presentations). The custom media presentation may incorporate audio and visual information that is publicly available or accessible from one or more databases or severs and that is combined by the media generation module 119 to create the media content, as described herein.

In an aspect of the present disclosure, at least two of the recognition device 101, the media delivery device (e.g., user's device 107, or media delivery devices 116, 117, or 118), or the media transmission device 108 are in wireless communication with each other through a wireless connection. Alternatively, some or all communications connections may be achieved through wired connections.

In an aspect of the present disclosure, the media transmission device 108 is configured to allow the user 102 to select from the primary media presentation, the secondary media presentation, or the custom media presentation, as described herein. The user may also toggle between various media presentations that are synchronized and transmitted substantially simultaneously.

An exemplary architecture of a machine learning model 200 employable by the media transmission device 108 is illustrated in FIG. 2.

Referring particularly to FIG. 2, the neural network 201 is in communication with the media transmission device 108. The neural network 201 includes at least one of an artificial intelligence (AI) drive search module 202 and/or a natural language processing module 203. The custom media content is generated by the AI driven search module 202 or the natural language processing module 203 of the neural network 201.

As an example, the machine learning model 200 may include a neural network 201 including or configured to communicate with a deep learning module 204, a classifier 205, a rules based engineering module 206, a computer sensing module 207, a natural language processing module 203, and/or an artificial intelligence (AI) drive search module 202. The Deep learning module 204 may access training data, such as training data stored in a training data database 208. The training data database 208 can be continuously updated with new/expanded training data. Training an AI module, such as a deep learning model, is described in more detail below. The classifier 205 may be employed by at least one of the deep learning module 204 or the rules based engineering module 206. The computer sensing module 207 may be employed in identifying a user and/or with monitoring facial expressions and/or body language of a user to monitor a user's reaction to a particular custom content that is presented to the user. The computer sensing module 207 may employ or interface with any of the scanner/sensors 212 (see, also, e.g., sensors/scanners 112, 113, and 114 in FIG. 1) described herein. The AI drive search module 202 and/or the natural language processing module 203 may communicate with the internet 210 to receive data employable in generating media presentations. Updated information may be captured from the internet 210 on a constant and instantaneous or near-instantaneous basis, such that media content can always be maximally current and employed for use in generating custom content (e.g., based on user preferences).

The neural network 201 may refer to the architectural core of the machine learning model 200. The neural network 201 may take a set of inputs, pass the inputs through a series of hidden layers, in which each layer can transform the inputs, and then produce an output. The process of transforming the input is determined by the weights and biases of the neurons in the hidden layers of the neural network 201, which are learned from data during training of the neural network (see, e.g., training data database 208). The neural network 201 may include relatively simple (single layer) or relatively complex structures (multiple layers). The deep learning module 204 may employ a particular type of neural network (e.g., a Convolutional Neural Network) to process image data, while the classifier 205 may use another type of neural network (e.g., a Feed-Forward Neural Network) to make predictions based on the processed data.

The deep learning module 204 may be employed by the neural network 201. The deep learning module 204 may deliver high-dimensional representations of user data to the neural network 201. The neural network 201 may then use the information from the deep learning module 204 to learn complex patterns and inform the neural network's decision-making processes. Similarly, the classifier 205 may be employed by the neural network 201. The classifier 205 may use the neural network's output to categorize or classify inputs into different classes. Additionally, the neural network 201 may help guide the AI-driven search module 202 by helping to understand and rank content according to the content's relevance to the user. The AI-driven search module 202 may use the learned representations from the neural network 201 to better tailor search results. The neural network 201 may work with the natural language processing module 203 by generating language representations that the natural language processing module 203 may use for understanding and generating text. The neural network may employ the sensory data from the computer sensing module 207 to help inform the neural network's understanding of the user's context. For example, location data from the computer sensing module 207 may be employed to adjust recommended custom content according to the user's location within the venue.

The computer sensing module 207 may process sensory data received at the machine learning module 200. For example, the computer sensing module 207 may process location data from a user's smartphone or from beacons located within the venue. Additionally, the computer sensing module 207 may collect information about the user and the user's environment. To collect user data, the computer sensing module 207 can interface with various hardware devices (e.g., scanners/sensors), such as for example, cameras for facial recognition, microphones for detecting a user's spoken inquiries, location sensors for tracking the user's location within the venue, or an app (e.g., a smartphone application or an application running on a local computer) for collecting direct user feedback (e.g., direct user feedback may include ratings or comments). This user feedback data may include the user's real-time reaction to custom content delivered by the system. A user's reaction may be analyzed via audio, video, or user review data.

Sensory inputs from the computer sensing module 207 may be employed to deliver real-time custom content. The computer sensing module 207 may transmit sensory data to the deep learning module 204. The sensory data can be processed by the deep learning module 204 to provide insight into the user's behavior or preferences. For example, the user's facial expressions may be used to assess the user's interest or engagement level.

This real-time user feedback can be used to further personalize the custom-content delivered to the user (e.g., a user displaying disinterest in a particular topic may be given less content about that topic). This real-time user feedback can be used to affect the type of content chosen by the classifier 205. The real-time user feedback may be used by the rules-based engineering module 206 to modify the type of content given to the user. The rules-based engineering module 206 may execute one or more rule based algorithms relating to user behavior, for example, if the user is determined to be bored or distracted. In that circumstance, the machine learning model 200 would use the senor data to infer the user's state of boredom or distraction and implement rules to increase user engagement, such as be executing one or more rule based algorithm by the rules based engineering module 206.

Data from the computer sensing module 207 can be used by the AI-driven search module 202 to refine content retrieval and ranking. For example, if a user displays a strong engagement level with a certain type of content, the AI-driven search module 202 may prioritize similar content in its search results. Audio feedback from the user in the form of commands or questions can be employed by the natural language processing module 203 to understand these inquiries and modify content delivery accordingly.

The deep learning module 204 can be employed for generating embeddings and high-dimensional representations of the user data. The deep learning module 204 can receive data inputs such as user age, gender, education, interests, interaction history at the venue, and transform these inputs into a representation of the user's underlying preferences. The outputs from the deep learning module 204 can be employed by the other modules within the machine learning model 200 to make predictions about what content to deliver to a particular user. Over the course of predictions and feedback, the deep learning module 204 can become more accurate in determining user preferences.

The output from the deep learning module 204 can serve as the primary output for the classifier 205. The classifier 205 can receive the outputs from the deep learning module 204 and use those outputs to make decisions about what content to deliver to the user. Feedback from the classifier 205 can then be used to adjust and refine the outputs from the deep learning module 204. The deep learning module output can act on the rules-based engineering module 206 to inform and update the rule-based engineering module's rule implementation. For example, if the deep learning module 204 determines the user has a high degree of interest in a topic, then a rule might be triggered to provide more complex or detailed content related to the particular topic. Outputs from the deep learning module 204 can be used by the AI-driven search module 202 to inform the AI-driven search module's prioritization of content. For example, if the deep learning module 204 determines user interest in a particular topic, then the AI-driven search module 202 can prioritize identifying and delivering updated information about that specific topic to the user. Speech or text user inputs received from a user (e.g., via the computer sensing module 207) can be transformed into a high-dimensional representation that the natural language processing module 203 can interpret.

The classifier 205 can receive inputs and assign a class label to those inputs. The classifier 205 can take the embedded generated outputs from the deep learning module 204 and make a prediction about the type of content a user is likely to be interested in. For example, at a museum, an art lover would be directed to art exhibits. Particularly, if the user was a Picasso fan then the user would be directed to Picasso exhibits. However, the content the Picasso fan would receive would vary depending on the user's specific characteristics. If the user was a well-versed Picasso fan, then this user would receive more complex and expert-level content than a user with little to no Picasso knowledge. The classifier 205 can be employed in selecting the general content, and the particular content from a more general category of content, to be delivered to the user after determining the content applicable to the user's unique characteristics.

The classifier 205 can work in tandem with the rules-based engineering module 206. After the classifier 205 makes predictions, but before the predicted content is relayed to the user, the predictions may be filtered or adjusted by the rules-based engineering module 206 to ensure the classifier's predictions comply with certain constraints or business rules. For example, certain content may be age restricted, in which case, the content may not be presented to a user under a certain age. Additionally, the classifier 205 may interact with the AI-driven search module 202 to focus the AI-driven search module 202 on content similar to what the classifier 205 determines is the most relevant content to the user. The classifier 205 may use feedback from the natural language processing module 203 to further refine content selection. For example, the natural language processing module 203 may interpret the user's input as expressing an interest in particular content, then the classifier 205 can prioritize delivery of that particular content.

The rules-based engineering module 206, by utilizing predefined logic and constraints (rules), can be employed to influence the machine learning model's output of real-time custom content. In the context of delivering custom content, the rules utilized by the rules-based engineering module 206 may relate to what kind of content to recommend or not recommend to a user based on a number of predetermined or generated constraints (e.g., based on age restrictions or classified levels of complexity). For example, the rules may be against recommending certain types of content to underage users, or rules about ensuring the system recommends a diverse set of content. The rules may also apply to edge cases that may not be well-covered by the data used to train the deep learning module 204. The rules-based engineering module 206 may allow for explicitly programmed decisions or behaviors to control the recommended custom-content. The rules utilized by the rules-based engineering module 206 may be set in advance, added at a later time, or can be updated periodically to improve content output for a user. The rules may apply to ensure the custom content recommendations comply with ethical or legal guidelines established by the venue, for example.

The rules-based engineering module 206 may use the output from the deep learning module 204 to determine which rules apply to the user. For example, if the deep learning module 204 determines the user is a child, then the rules-based engineering module 206 would enforce rules applicable to children. Additionally, the rules-based engineering module 206 may adjust recommendations from the classifier 205. For example, if the classifier 205 recommends an exhibit that is closed, then the rules-based engineering module 206 could override the classifier's decision. The rules-based engineering module 206 may take location data from the computer sensing module 207 and invoke rules applicable to that particular location within the venue. The rules-based engineering module 206 may interact with the AI-driven search module 202 to help guide the AI-driven search module 202 in finding content, or information to be incorporated into the content. For example, the machine learning model 200 may employ a rule that the AI-driven search module 202 prioritizes recent or popular content. The machine learning model 200 may employ rules about certain types of language (e.g., descriptive language, technical language, particular levels of vocabulary or terminology) or about interpreting certain user inputs. Thus, the rules-based engineering module 206 may invoke rules that directly operate on the natural language processing module 203.

The AI-driven search module 202 may be used to search either on the internet or other available content (e.g., content stored in a database) to find content most relevant to user's specific interests and needs. The AI-driven search module 202 may use a collaborative filtering technique to find content that similar users have interacted with or may use content-based filtering to find content that is similar to items the particular user has interacted with in the past. The AI-driven search module 202 may also use reinforcement learning to continually improve the module's recommendations. For example, the AI-driven search module 202 may, over time, and through interaction with other modules of the machine learning model 200, learn which type of recommendations lead to positive user reactions and prioritize similar content in the future. The AI-driven search module 202 may also use real-time user feedback to adjust recommendations instantaneously or substantially instantaneously.

The AI-driven search module 202 may use the outputs from the deep learning module 204 to create a deeper understanding of the user's interests. The deep learning module 204 output may help the AI-driven search module 202 rank and retrieve the most relevant content to deliver to the user. Additionally, the AI-driven search module 202 may use classification outputs from the classifier 205 to guide the search. For example, a user classified as an "expert Picasso enthusiast" (e.g., by the classifier 205) may help the AI-driven search module 202 prioritize delivery of high-level content related to Picasso exhibits. The rules invoked by the rules-based engineering module 206 may modulate the prioritization of content retrieved by the AI-driven search module 202. The neural network 201 may provide learned representations that are then used by the AI-driven search module 202 to rank and retrieve the most relevant custom content. The AI-driven search module 202 may employ the natural language processing module 203 to better understand text-based user inputs.

The natural language processing module 203 may be employed by the machine learning model 200 to understand, interpret, generate, and interact with spoken or written human language. This may include understanding user queries or understanding text-based content. The natural language processing module 203 may be used to understand user feedback or enable text-based user interactions. For example, a user may be able to search for content via a natural language search. Additionally, the natural language processing module 203 may be used to generate human-like text responses that can be used to communicate with the user. This may also include generating the custom content delivered by the system. Moreover, the natural language processing module 203 may enable real-time dialogue between the user and the machine learning model 200, allowing the user to ask questions, provide feedback, or change their preferences in a natural, conversational way.

The natural learning processing module 203 may use the deep learning module 204 to process and understand human language inputs. The output from the deep learning module 204 may be used to enhance understanding and generation of natural language. The natural language processing module 203 may use the output from the classifier 205 to tailor the language used in response to a user (e.g., the system may use different vocabulary to convey custom content to a child versus an adult). The rules-based engineering module 206 can guide the natural language processing module's 203 use of certain phrases or preferring certain response types. The natural language processing module 203 may use the learned representations from the neural network 201 to better understand the semantics of the user's input and generate appropriate responses. The natural language processing module 203 may help guide the AI-driven search module 202 by interpreting user inquiries and thereby improving the AI-driven search module's 202 search effectiveness. The natural language processing module 203 may gather speech inputs from the computer sensing module 207 and transcribe and interpret those inputs.

As an example, the venue 103 at which the presence of the user 102 is identified is a museum, an exhibit, an exposition, a trade show, a festival, an airport, a train station, a theater, a public space, a theme park, a retail establishment, a restaurant, a cruise ship, a hotel, a resort, a sports arena, or a sports stadium.

In an aspect of the present disclosure, the recognition device 101 is configured to identify the user 102 by facial recognition, scanning a bar code, scanning a QR code, and/or receiving a near-field communication signal. The recognition device 101 may include the scanner 115 configured to identify the user 102 by facial recognition, for example, or by a signal or data presented by a device associated with the user 102, such as a smartphone (see, e.g., user's device 107, which may be a smartphone). The recognition device 101 may also have a keypad or other data entry feature allowing a user 102 to manually identify who they are or to set user preferences. The recognition device 101 can also be employed by the user 102 to enter new or updated user preferences, such as upon arrival at a particular venue. The user preferences may also be set in advance and may be accessed from a database storing the user's previously recorded preferences.

Figure 3:
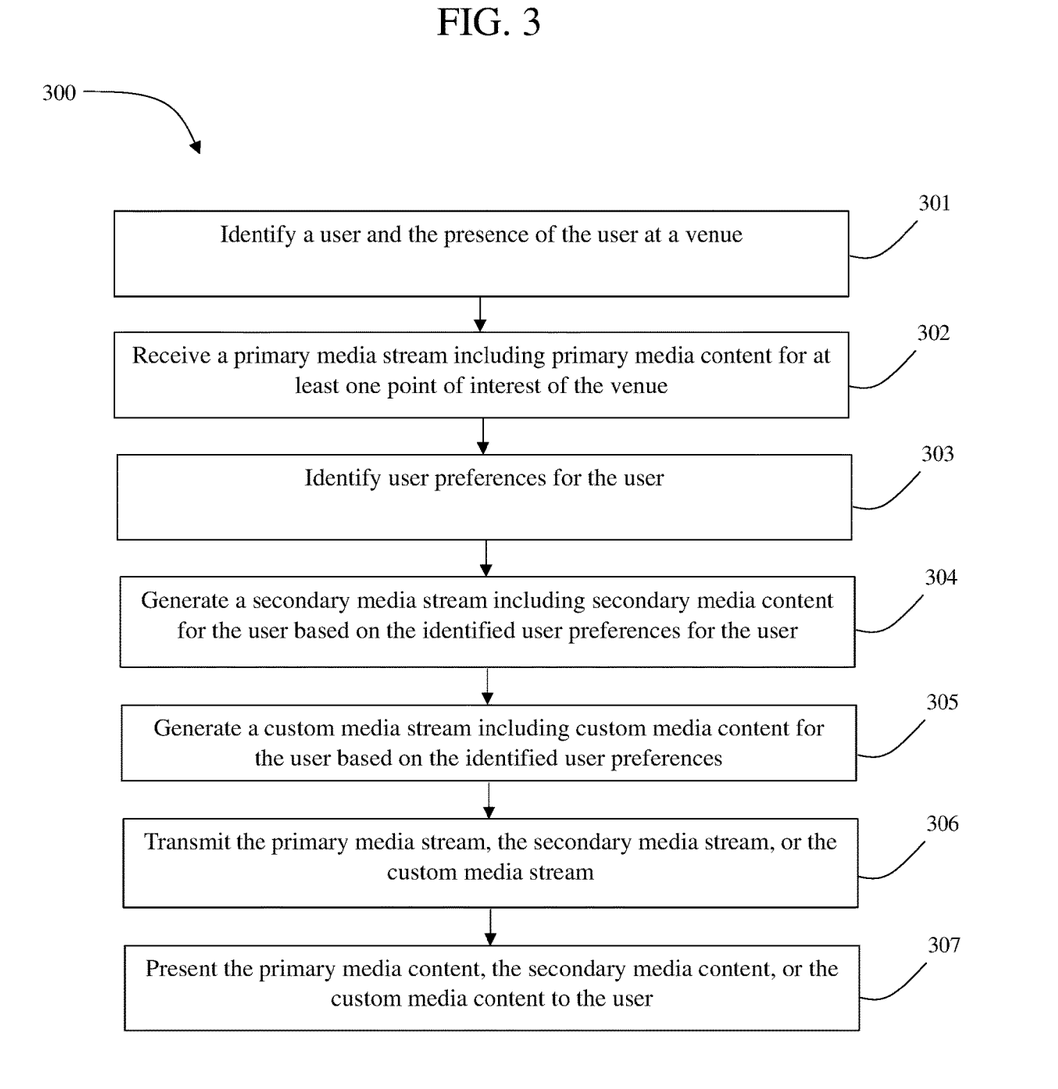
FIG. 3 is a flow chart of a computer-implemented method of providing customized media content according to aspects of the present disclosure.

Referring particularly to FIG. 3, a computer-implemented method 300 of providing customized content includes providing customized content including identifying a user and the presence of the user at the venue 301. The venue includes at least one point of interest. The method includes receiving a primary media presentation including primary media content for a point of interest of the venue 302. The method includes identifying user preferences for the user 303. The method includes generating a secondary media presentation including secondary media content for the user based on the identified user preferences for the user 304. The method includes generating a custom media presentation including custom media content for the user based on the identified user preferences 305. The custom media content includes at least some of the primary media content and at least some of the secondary media content. The method includes transmitting the primary media presentation, the secondary media presentation, or the custom media presentation from the media transmission device to the media delivery device 306. The method includes presenting the primary media content, the secondary media content, or the custom media content to the user 307. The presented media content includes at least one of audio, visual or tactile content.

Figure 4:
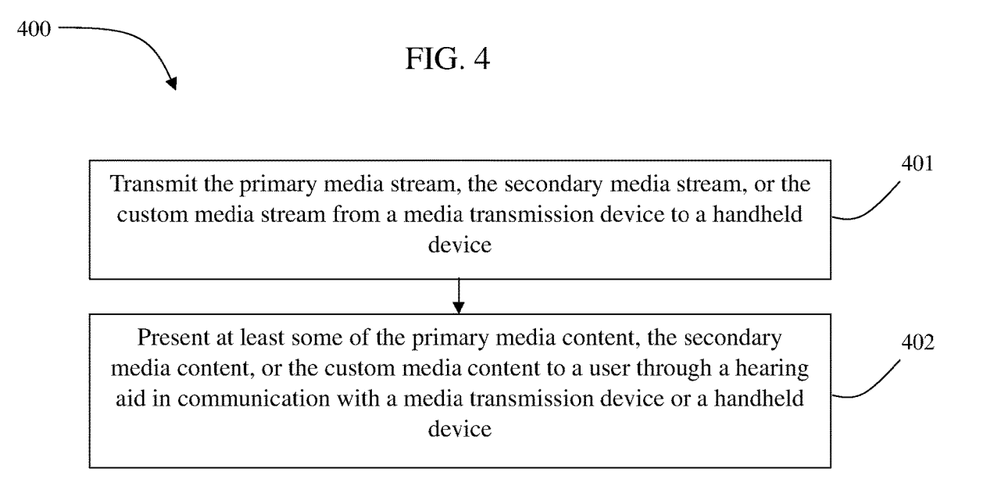
FIG. 4 is a flow chart of another computer-implemented method of providing customized media content according to aspects of the present disclosure.

Referring particularly to FIG. 4, the computer-implemented method 400 of providing customized content may include transmitting the primary media presentation, the secondary media presentation, or the custom media presentation from a media transmission device to a handheld device 401. The method includes presenting at least some of the primary media content, the secondary media content, or the custom media content to the user through a hearing aid in communication with the media transmission device or the handheld device 402.

Figure 5:
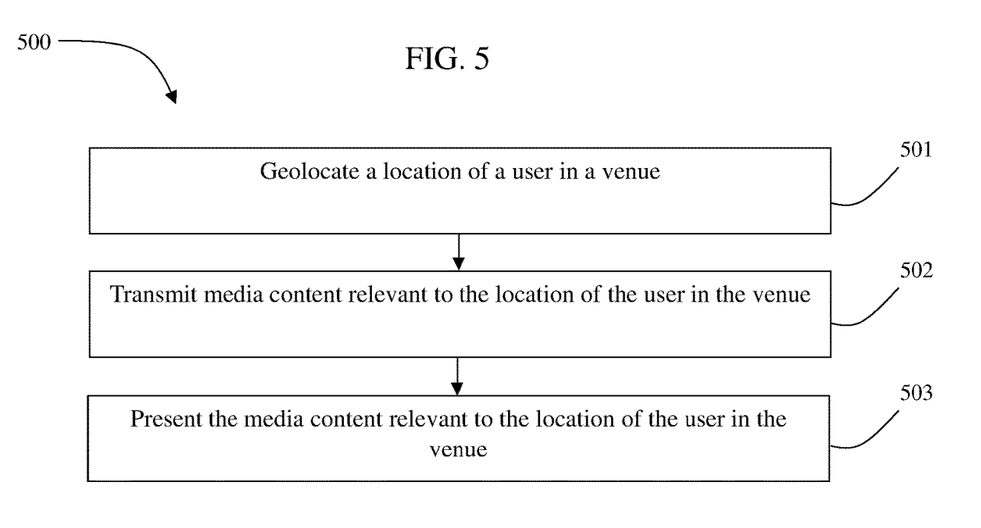
FIG. 5 is a flow chart of another computer-implemented method of providing customized media content according to aspects of the present disclosure.

Referring particularly to FIG. 5, computer-implemented method 500 of providing customized content may include geolocating a location of the user in the venue 501. The method includes transmitting media content relevant to the location of the user in the venue 502. The method includes presenting the media content relevant to the location of the user in the venue 503.

Referring particularly to FIG. 6, a general-purpose computer 600 is described. The devices described herein (e.g., the local device or recognition device 101 of FIG. 1, or the smartphone or personalized handheld device 707 or 807 of FIG. 7 or 8, or a computer employed at or by any of the points of interest in FIG. 1, 7, or 8) may have the same or substantially the same structure as the computer 600 or may incorporate at least some of the components of the computer 600. The general-purpose computer 600 can be employed to perform the various methods and algorithms described herein. The computer 600 may include a processor 601 connected to a computer-readable storage medium or a memory 602 which may be a volatile type memory, e.g., RAM, or a non-volatile type memory, e.g., flash media, disk media, etc. The processor 601 may be another type of processor such as, without limitation, a digital signal processor, a microprocessor, an ASIC, a graphics processing unit (GPU), field-programmable gate array (FPGA) 603, or a central processing unit (CPU).

In some aspects of the disclosure, the memory 602 can be random access memory, read-only memory, magnetic disk memory, solid state memory, optical disc memory, and/or another type of memory. The memory 602 can communicate with the processor 601 through communication buses 604 of a circuit board and/or through communication cables such as serial ATA cables or other types of cables. The memory 602 includes computer-readable instructions that are executable by the processor 601 to operate the computer 600 to execute the algorithms described herein. The computer 600 may include a network interface 605 to communicate (e.g., through a wired or wireless connection) with other computers or a server. A storage device 606 may be used for storing data. The computer may include one or more FPGAs 603. The FPGA 603 may be used for executing various machine learning algorithms. A display 607 may be employed to display data processed by the computer 600.

Generally, the memory 602 may store computer instructions executable by the processor 601 to carry out the various functions described herein.

The computer 600 may employ various artificial intelligence models, such as one or more machine learning models or algorithms as part of the media generation module 119 and/or the media transmission device 108.

The classifier 205 may include a convolutional neural network (CNN, or ConvNet), a Bayesian network, a neural tree network, or a support-vector machine (SVM).

While a CNN may be employed, as described herein, other classifiers or machine learning models may similarly be employed. The machine learning model may be trained on tagged data. The trained CNN, trained machine learning model, or other form of decision or classification processes can be used to implement one or more of the methods, functions, processes, algorithms, or operations described herein. A neural network or deep learning model can be characterized in the form of a data structure storing data representing a set of layers containing nodes, and connections between nodes in different layers are formed or created that operate on an input to provide a decision or value as an output.

Machine learning can be employed to enable the analysis of data and assist in making decisions. To benefit from using machine learning, a machine learning algorithm is applied to a set of training data and labels to generate a "model" which represents what the application of the algorithm has "learned" from the training data. Each element (e.g., one or more parameters, variables, characteristics, or "features") of the set of training data is associated with a label or annotation that defines how the element should be classified by the trained model. A machine learning model predicts a defined outcome based on a set of features of an observation. The machine learning model is built by being trained on a dataset which includes features and known outcomes. There are various types of machine learning algorithms, including linear models, support vector machines (SVM), Bayesian networks, neural tree networks, random forest, and/or XGBoost. A machine learning model may include a set of layers of connected neurons that operate to decide (e.g., a classification) regarding a sample of input data. When trained (e.g., the weights connecting neurons have converged and become stable or within an acceptable amount of variation), the model will operate on new input data to generate the correct label, classification, weight, or score as an output. Other suitable machine learning models may be similarly employed.

Unless otherwise indicated below, the systems 700 and 800 described below with reference to FIGS. 7 and 8 below are substantially the same as the system 100 described above with reference to FIGS. 1 to 6, and thus duplicative descriptions may be omitted below.

Referring particularly to FIG. 7, the media transmission device 108 may operate on a handheld device or a smartphone 707. The handheld device or smartphone 707 may detect a location of the user 702, generate custom content based on user preferences as described herein, and may present the generated custom data to the user. For example, the handheld device or smartphone 707 may present audio, video, or audiovisual content to the user 702 at the direction of the media generation module 719, and thus the handheld device or smartphone 707 may operate as a media generation module.

Referring particularly to FIG. 8, the media generation module 819 may communicate with machine learning model 200 operating in the cloud, such as through a cloud-based server that is accessible by any of the local device (see, e.g., FIG. 1), or the handheld device or smartphone. That is, the system and method described with reference to FIGS. 1-6 can also have a similar cloud-based neural network and/or a cloud-based media transmission device and/or media generation module that interacts with a local device.

The scanner/sensor described herein can include a camera and/or a microphone (e.g., a camera or microphone embodied in a smartphone or other handheld device, or a camera and microphone installed at a point of interest.

Connections between the various modules, hardware, and other components described herein may be achieved through either wired or wireless connections, such as wireless connections through WiFi, BlueTooth, or other short range wireless communication protocols (e.g., radio frequencies).

Audio content, as described herein, may be played through a speaker, headphones (e.g., wired or wireless headphones), or through a user's hearing aid(s).

Visual content, as described herein, may be presented on a screen, in smart glasses, or as a projection, such as a 3-D projection.

It will be understood that various modifications may be made to the aspects and features disclosed herein. Therefore, the above description should not be construed as limiting, but merely as exemplifications of various aspects and features. Those skilled in the art will envision other modifications within the scope and spirit of the claims appended thereto.

What is claimed is:

1. A system for providing customized content, comprising:
   a recognition device configured to identify at least one user and the presence of the at least one user at a venue, wherein the venue includes at least one point of interest;
   a media generation module in communication with the recognition device;
   an artificial neural network in communication with the media generation module, wherein the artificial neural network includes a deep learning module, and an artificial intelligence (AI) driven search module,
   wherein the media generation module is configured to:
      generate an initial media presentation for the at least one point of interest of the venue;
      identify user preferences for the at least one user, wherein identifying the user preferences includes identifying, by the deep learning module of the artificial neural network, at least one topic of interest for the at least one user;
      detect a location of the at least one user in the venue with respect to the at least one point of interest of the venue;
      generate a custom media presentation for the at least one user based on the initial media presentation, the identified user preferences for the at least one user, and the detected location of the at least one user in the venue;
      update the generated custom media presentation for the at least one user based on the identified user preferences, the at least one topic of interest for the user, and the detected location of the at least one user in the venue concurrently with the presence of the at least one user at the venue,
      wherein updating the generated custom media presentation includes identifying, by the AI driven search module of the artificial neural network, updated information about the at least one topic of interest for the user,
      wherein updating the generated custom media presentation further includes identifying, by the AI driven search module of the artificial neural network, content that additional users similar to the at least one user have interacted with, using a collaborative filtering technique,
      wherein updating the generated custom media presentation further includes identifying, by the AI driven search module of the artificial neural network, content similar to items the at least one user has previously interacted with, using a content-based filtering technique; and
      present the updated custom media presentation to the at least one user, wherein the presented updated media presentation includes at least one of audio, visual or tactile content.

2. The system of claim 1, wherein the media transmission device is configured to generate the custom media presentation for the at least one user based on at least one identified user preference of the identified user preferences selected from preferred language, preferred learning style, visual presentation for the hearing impaired, auditory presentation for the visually impaired, tactile presentation for the visually impaired, preferred presentation style based on education level, or preferred presentation style based on personal interests.

3. The system of claim 2, wherein the media transmission device is configured to generate the updated custom media presentation for the at least one user based on at least one identified user preference of the identified user preferences selected from preferred language, preferred learning style, visual presentation for the hearing impaired, auditory presentation for the visually impaired, tactile presentation for the visually impaired, preferred presentation style based on education level, or preferred presentation style based on personal interests.

4. The system of claim 1, wherein the venue at which the presence of the at least one user is identified is a museum, a visitor's center, a park, a doctor's office, an exhibit, a theater, a public space, a theme park, a retail establishment, a restaurant, a cruise ship, a hotel, a resort, a sports arena, or a sports stadium.

5. The system of claim 1, wherein the recognition device is configured to identify the at least one user by at least one of facial recognition, scanning a bar code, scanning a QR code, or receiving a near-field communication signal.

6. The system of claim 1, wherein the artificial neural network includes a natural language processing module, wherein the artificial neural network employs the natural language processing module when updating the generated custom media presentation for the at least one user.

7. The system of claim 1, further including a media delivery device configured to be held by a user, wherein the updated custom media presentation is transmitted to the media delivery device for presentation to the user.

8. The system of claim 7, wherein the media delivery device is a smartphone or tablet computer configured to be held by the user.

9. The system of claim 8, wherein the smartphone or tablet computer is configured to read a scannable code or receive a signal indicating that the user is nearby the at least one point of interest of the venue.

10. The system of claim 9, wherein the smartphone or tablet computer is configured to interact with a computer of the at least one point of interest of the venue to generate the updated custom media presentation for the at least one user.

11. A computer-implemented method of providing customized content, comprising:

identifying, by a recognition device, at least one user and the presence of the at least one user at a venue, wherein the venue includes at least one point of interest;

generating, by a media generation module in communication with the recognition device, an initial media presentation for the at least one point of interest of the venue;

identifying user preferences for the at least one user, wherein identifying the user preferences includes identifying, by a deep learning module of an artificial neural network, at least one topic of interest for the at least one user;

detecting a location of the at least one user in the venue with respect to the at least one point of interest of the venue;

generating, by the media generation module, a custom media presentation for the at least one user based on the initial media presentation, the identified user preferences for the at least one user, and the detected location of the at least one user in the venue;

updating, by the media generation module, the generated custom media presentation for the at least one user based on the identified user preferences, the at least one topic of interest for the user, and the detected location of the at least one user in the venue concurrently with the presence of the at least one user at the venue, wherein updating the generated custom media presentation includes identifying, by an AI driven search module of the artificial neural network, updated information about the at least one topic of interest for the user, wherein updating the generated custom media presentation further includes identifying, by the AI driven search module of the artificial neural network, content that additional users similar to the at least one user have interacted with, using a collaborative filtering technique, wherein updating the generated custom media presentation further includes identifying, by the AI driven search module of the artificial neural network, content similar to items the at least one user has previously interacted with, using a content-based filtering technique; and presenting the updated custom media presentation to the at least one user, wherein the presented updated media presentation includes at least one of audio, visual or tactile content.

12. The computer-implemented method of claim 11, wherein the custom media presentation for the at least one user is generated based on at least one identified user preference of the identified user preferences selected from preferred language, preferred learning style, visual presentation for the hearing impaired, auditory presentation for the visually impaired, tactile presentation for the visually impaired, preferred presentation style based on education level, or preferred presentation style based on personal interests.

13. The computer-implemented method of claim 12, wherein the updated custom media presentation for the at least one user is generated based on at least one identified user preference of the identified user preferences selected from preferred language, preferred learning style, visual presentation for the hearing impaired, auditory presentation for the visually impaired, tactile presentation for the visually impaired, preferred presentation style based on education level, or preferred presentation style based on personal interests.

14. The computer-implemented method of claim 11, wherein the venue at which the presence of the at least one user is identified is a museum, a visitor's center, a park, a doctor's office, an exhibit, a theater, a public space, a theme park, a retail establishment, a restaurant, a cruise ship, a hotel, a resort, a sports arena, or a sports stadium.

15. The computer-implemented method of claim 11, wherein the recognition device identifies the at least one user by at least one of facial recognition, scanning a bar code, scanning a QR code, or receiving a near-field communication signal.

16. The computer-implemented method of claim 11, wherein the updated custom media presentation is generated by the AI driven search module and a natural language processing module of the artificial neural network.

17. The computer-implemented method of claim 11, wherein the updated custom media presentation is transmitted to a media delivery device for presentation to the user.

18. The computer-implemented method of claim 17, wherein the media delivery device is a smartphone or tablet computer configured to be held by the user.

19. The computer-implemented method of claim 18, further including reading a scannable code or receiving a signal indicating that the user is nearby the at least one point of interest of the venue.

20. The system of claim 19, wherein the smartphone or tablet computer interacts with a computer of the at least one point of interest of the venue to generate the updated custom media presentation for the at least one user.

* * * * *